(12) United States Patent
Yokawa et al.

(10) Patent No.: US 9,347,517 B2
(45) Date of Patent: May 24, 2016

(54) TORQUE ROD

(75) Inventors: Manabu Yokawa, Isehara (JP); Naoyuki Kamei, Yokohama (JP)

(73) Assignees: NISSAN MOTOR CO., LTD., Yokohama-shi (JP); BRIDGESTONE CORPORATION, Tokyo (JP)

( * ) Notice: Subject to any disclaimer, the term of this patent is extended or adjusted under 35 U.S.C. 154(b) by 38 days.

(21) Appl. No.: 14/131,839

(22) PCT Filed: Jun. 13, 2012

(86) PCT No.: PCT/JP2012/065084
§ 371 (c)(1),
(2), (4) Date: Jan. 9, 2014

(87) PCT Pub. No.: WO2013/008576
PCT Pub. Date: Jan. 17, 2013

(65) Prior Publication Data
US 2014/0151946 A1 Jun. 5, 2014

(30) Foreign Application Priority Data

Jul. 13, 2011 (JP) ................................. 2011-154575

(51) Int. Cl.
*F16F 1/38* (2006.01)
*F16F 15/08* (2006.01)
*B60K 5/12* (2006.01)

(52) U.S. Cl.
CPC ................ *F16F 15/08* (2013.01); *B60K 5/1208* (2013.01); *B60K 5/1241* (2013.01); *F16F 1/38* (2013.01); *F16F 1/3849* (2013.01)

(58) Field of Classification Search
CPC ......... F16F 1/38; F16F 1/3828; F16F 1/3849; F16F 1/48; F16F 15/08; B60K 5/1208; B60K 5/1241
USPC .................... 267/140.11, 140.12, 140.5, 292; 74/579 R, 579 E; 280/124.13, 124.166
See application file for complete search history.

(56) References Cited

U.S. PATENT DOCUMENTS 8,967,599 B2 * 3/2015 Yoneyama .................. 267/141.1
2005/0212188 A1 * 9/2005 Endo .......................... 267/141.2
(Continued)

FOREIGN PATENT DOCUMENTS

EP 1 666 296 A1 6/2006
JP 2001-248671 A 9/2001
(Continued)

OTHER PUBLICATIONS

Russian Decision on Grant and English translation dated Mar. 3, 2015, 11 pgs.
(Continued)

*Primary Examiner* — Thomas J Williams
(74) *Attorney, Agent, or Firm* — Foley & Lardner LLP (57) ABSTRACT

Provided is a torque rod which has a first annular part of resin adapted to connect to a power unit; a second annular part of resin adapted to connect to a vehicle body; a connecting portion of resin that connects the first and second annular parts while arranging these parts at mutually twisted positions, the connecting portion having, at a surface including an outer cylindrical surface of the first annular part, a recess; a first elastic member provided in an inner cylindrical surface of the first annular part; a first metal collar member of which outer peripheral portion is supported by the first elastic member; a second elastic member provided in an inner cylindrical surface of the second annular part; a second metal collar member of which outer peripheral portion is supported by the second elastic member; a first rib structure formed on the surface including the outer cylindrical surface of the first annular part, the first rib structure having an end portion placed in the recess of the connecting portion; and a second rib structure formed on a surface including an outer cylindrical surface of the second annular part, the second rib structure having an end portion between the first and second annular parts at a position nearer to the first annular part than the end portion of the first rib structure.

11 Claims, 6 Drawing Sheets

(56) References Cited

U.S. PATENT DOCUMENTS

| | | | |
|---|---|---|---|
| 2007/0018367 A1* | 1/2007 | Kamei | 267/140.5 |
| 2007/0272051 A1* | 11/2007 | Kamei et al. | 74/579 R |
| 2008/0315473 A1* | 12/2008 | Nishimae et al. | 267/140.11 |
| 2013/0320181 A1* | 12/2013 | Kamei et al. | 248/548 |

FOREIGN PATENT DOCUMENTS

| | | | |
|---|---|---|---|
| JP | 2006-112537 A | | 4/2006 |
| JP | 2009-243483 A | | 10/2009 |
| JP | 2009243483 A | * | 10/2009 |
| JP | 2010-96277 A | | 4/2010 |
| JP | 2010137709 A | * | 6/2010 |
| JP | 2013228002 A | * | 11/2013 |
| RU | 2 042 172 C1 | | 8/1995 |

OTHER PUBLICATIONS

Supplementary European Search Report dated Dec. 3, 2014, 7 pgs.

* cited by examiner

TORQUE ROD

TECHNICAL FIELD

The present invention relates to a torque rod that restrains vibration of a power unit such as engine or the like.

BACKGROUND ART

Hitherto, a torque rod is known as a means for supporting a torque reaction force applied from a power unit such as engine or the like to a vehicle body.

For example, in a technology disclosed in Patent Document-1, a torque rod body is made of resin for reducing a weight of the torque rod. The torque rod has at both ends two mutually twisted annular parts and a rib structure of the torque rod extends from an outer cylindrical surface of one of the annular parts to an open portion (viz., a part where a rubber bush is exposed) of the other annular part.

However, in the technology described in Patent Document-1, loss of strength of the torque rod caused by resinification is compensated by an uniformed reinforcing rib structure that is formed on an outer surface of the torque rod body. Accordingly, there is room for improvement in much more reducing the weight of the torque rod and increasing the strength in the twist direction. That is, in conventional torque rods, there was room for improvement in reducing the weight of the torque rod and increasing the strength of the same.

PRIOR ART DOCUMENT

Patent Document

Patent Document-1: Japanese Laid-open Patent Application (Tokkai) 2006-112537

SUMMARY OF INVENTION

An object of the present invention is to realize further weight reduction of a torque rod and increase of strength of the same.

In order to achieve the object, a torque rod according to the present invention has first and second annular parts of resin which are connected to each other while being mutually twisted. A first rib structure is provided, which is formed on an outer surface of the first annular part and has an end portion in a recess formed in a connecting part of resin through which the two annular parts are connected. Furthermore, a second rib structure is provided, which is formed on an outer surface of the second annular part and has an end portion that is provided between the second annular part and the first annular part at a position nearer to the first annular part than the end portion of the first rib structure.

According to the present invention, first and second annular parts and a connecting part are made of resin and the connecting part is formed with a recess, so that weight reduction of a torque rod is realized. Furthermore, the first and second annular parts are formed with first and second rib structures at respective outer surfaces thereof and the first and second rib structures are overlapped at the connecting part, so that improvement of strength of the torque rod against extension, compression and twisting is realized.

Accordingly, further weight reduction of the torque rod and improvement of the strength of the same are realized.

EMBODIMENTS FOR CARRYING OUT INVENTION

In the following, torque rods of embodiments of the present invention will be described with reference to the accompanying drawings.

First Embodiment (Construction)

Figure 1:
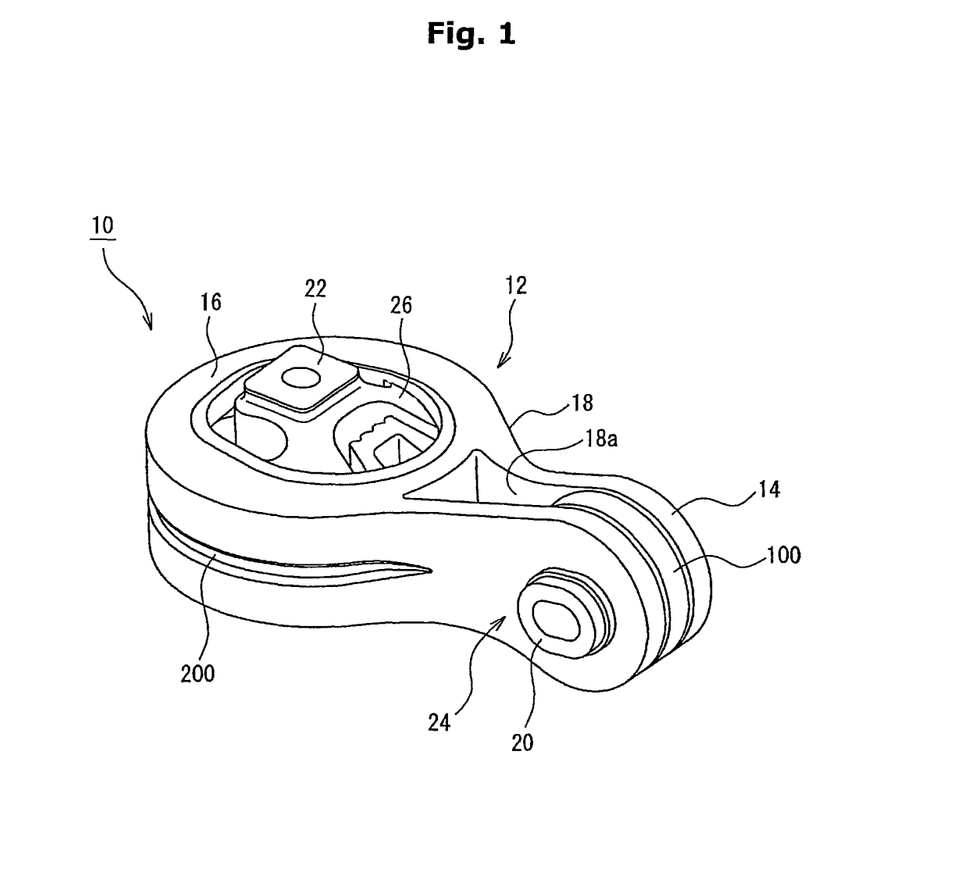
FIG. 1 is a perspective view showing a construction of a torque rod 10 which is a first embodiment of the present invention.
Figure 2A:
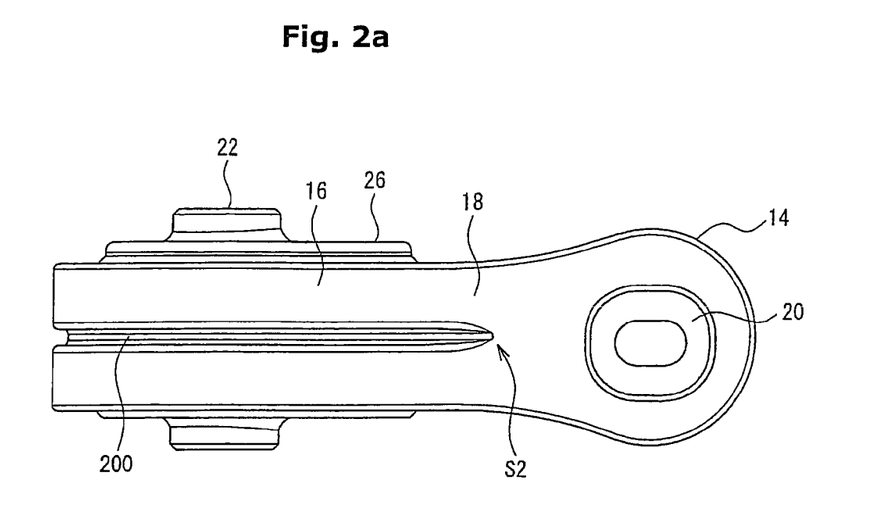
FIG. 2 provides front and top views which respectively show the construction of the torque rod 10 of the first embodiment.
Figure 2B:
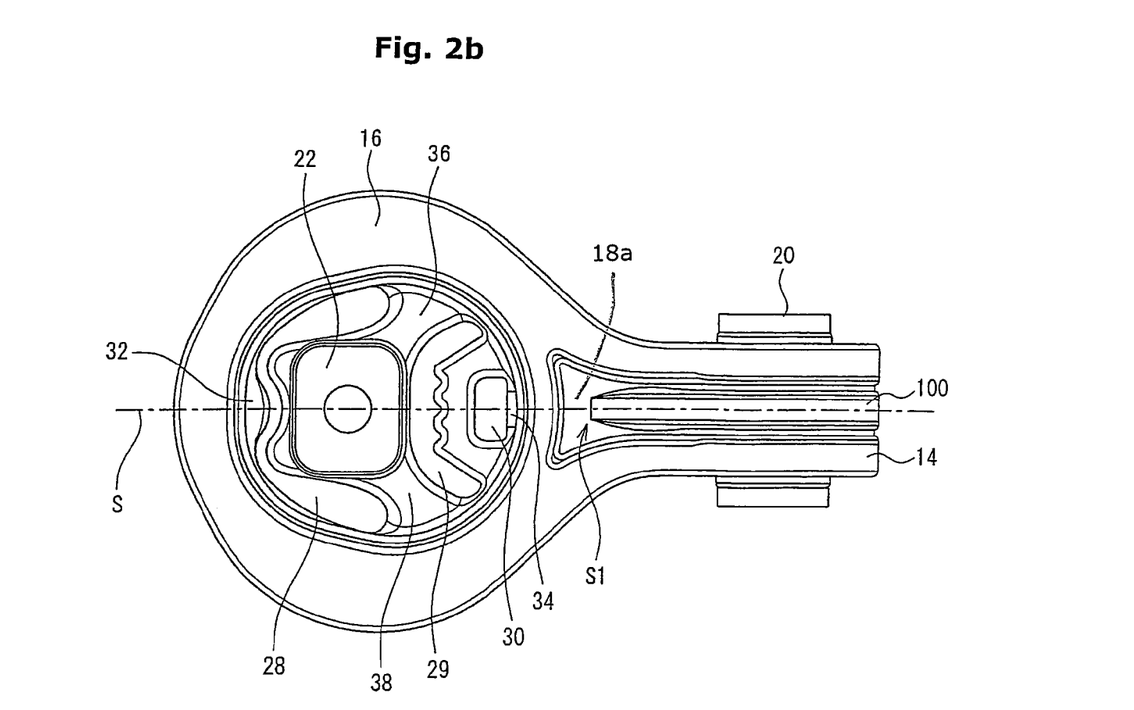
Figure 3:
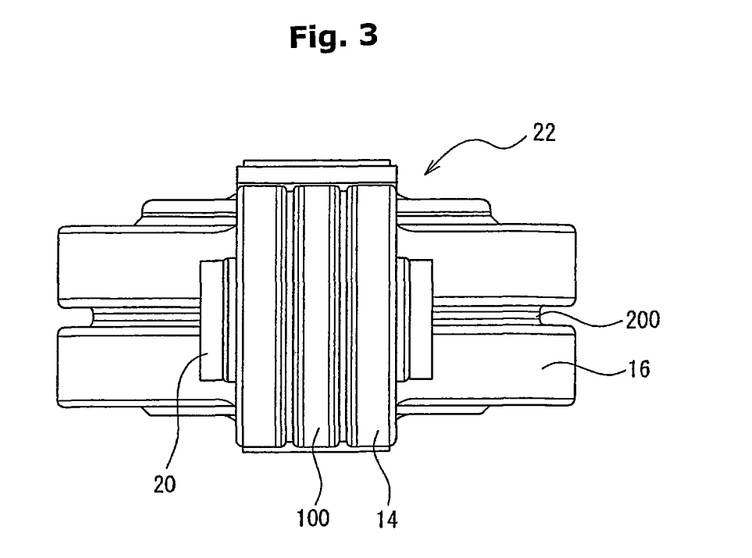
FIG. 3 is a right side view showing the construction of the toque rod 10 of the first embodiment.

Referring to FIGS. 1 to 3, there is shown a construction of a torque rod 10 which is a first embodiment of the invention, in which FIG. 1 is a perspective view, FIG. 2a is a front view, FIG. 2b is a top view and FIG. 3 is a right side view.

The torque rod 10 is a kind of mount that constitutes a vibration-proofing support mechanism for supporting a power unit, such as vehicular engine, relative to a vehicle body. The torque rod is arranged for example between a rear end of the power unit and the vehicle body to restrain the power unit from making displacement in a roll direction and in a vehicle body longitudinal direction caused by a torque reaction force and an inertial force of the power unit.

As is seen from FIGS. 1 to 3, when considered as a whole, the torque rod 10 is equipped with a rod body 12 of resin that is shaped to extend along one direction. The rod body 12 is provided at one longitudinal end side (viz., right side in FIGS. 1 and 2) thereof with a generally circular first annular part 14 and at the other longitudinal end side thereof with an annular second annular part 16 of which diameter is larger than that of the first annular part 14. The rod body 12 is further provided with a connecting stay portion 18 that extends from an outer cylindrical portion of the first annular part 14 along the longitudinal direction of the rod body 12 and is joined with an outer cylindrical portion of the second annular part 16. It is to be noted that a straight line that passes through both a center of the first annular part 14 defined with respect to radial and thickness directions of the part 14 and a center of the second annular part 16 defined with respect to radial and thickness directions of the part 16 is set as a main axis "S", and in the following, description will be carried out using a direction along the main axis "S" as an axial direction of the torque rod 10.

To respective inner sides of the first and second annular parts 14 and 16 of the torque rod 10, there are arranged pipe-like first and second mounting members 20 and 22, each being generally concentric to the corresponding annular part 14 or 16. As is seen from the drawings of FIG. 1, the torque rod 10 has a cylindrical rubber bush 24 that is received between an inner cylindrical surface of the first annular part 14 and an outer cylindrical surface of the first mounting member 20, and the rubber bush 24 has both an inner cylindrical surface bonded to the outer cylindrical surface of the first mounting member 20 through vulcanization-adhesion and an outer cylindrical surface bonded or fixed to the inner cylindrical surface of the first annular part 14 through an adhesive agent. With such bonding, the first mounting member 20 is elastically connected to the first annular part 14.

The second mounting member 22 is a rectangular tubular metal member that has a rectangular cross section and constitutes an inner cylinder of the second annular part 16.

Furthermore, as is seen from FIG. 1, the torque rod 10 has a slightly thicker cylindrical rubber-made elastic body 26 that is received between an inner cylindrical surface of the second annular part 16 and an outer cylindrical surface of the second mounting member 22, and the rubber-made elastic body 26 has an outer cylindrical surface bonded or fixed to an inner cylindrical surface of the second annular part 16 through an adhesive agent. The rubber-made elastic body 26 is formed, at both sides of the second mounting member 22, with three hollow (or bored) parts 28, 29 and 30 that are arranged along the axial direction of the torque rod, and these hollow parts 28, 29 and 30 pass through the rubber-made elastic body 26 while extending in an axial direction of the second mounting member 22.

The rubber-made elastic body 26 has both a stopper portion 32 that is positioned outside (viz., left side in FIG. 2b) the hollow part 28 with respect to the axial direction of the torque rod and another stopper portion 34 that is positioned inside (viz., right side in FIG. 2b) the hollow part 30 with respect to the axial direction of the torque rod. When the second mounting member 22 makes a displacement in the axial direction of the torque rod relative to the second annular part 16 by an amount equal to or greater than a predetermined amount, a wall surface of the second mounting member 22 or a wall surface of the hollow part 30 is brought into contact with the stopper portion 32 or 34 thereby to restrict the displacement of the second mounting member 22 in the axial direction of the torque rod.

Figure 4:
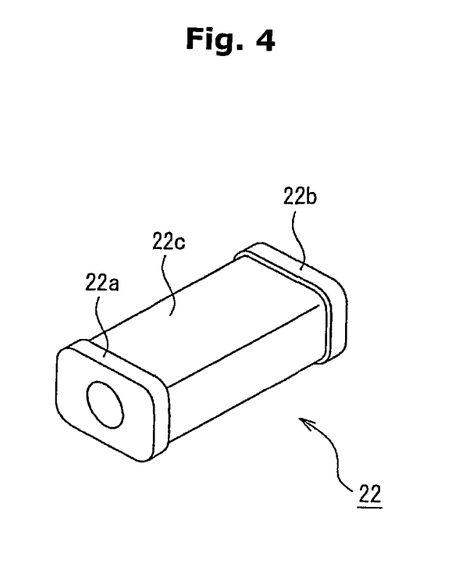
FIG. 4 is a view showing a construction of a second mounting member 22.

FIG. 4 is a drawing showing a construction of the second mounting member 22.

As is seen from FIG. 4, the second mounting member 22 is formed at both ends thereof with respective flange parts 22a and 22b, so that when the second mounting member 22 is bolted to an external part, each flange part can serve as an abutting surface against the external part. While, a body part 22c of the second mounting member 22, which is sandwiched between the flange parts 22a and 22b, is made smaller in outer size than the flange parts 22a and 22b.

Since the rod body 12 is made of resin, the rod body 12 has to be made thicker than a metal-made rod body. However, fortunately this thicker construction of the rod body 12 allows the rod body 12 to form a space for receiving therein the rubber-made elastic body 26 and thus the rod body 12 can secure a stroke provided by the elastic deformation of the rubber-made elastic body 26.

The rubber-made elastic body 26 is formed with a pair of connecting rubber portions 36 and 38 between the hollow parts 28 and 29 along a circumferential direction. Each of these connecting rubber portions 36 and 38 has an inner wall bonded to the outer surface of the second mounting member 22 through vulcanization-adhesion. With this, the paired connecting rubber portions 36 and 38 function to resiliently or elastically connect the second mounting member 22 to the second annular part 16. When the second mounting member 22 is subjected to a relative displacement along the axial direction of the torque rod, elastic deformation in a shear direction takes place mainly, while when the second mounting member 22 is subjected to a relative displacement in a radial direction perpendicular to the axial direction of the torque rod, elastic deformation in extension and compression directions takes place mainly.

The hollow part 28 is shaped to surround an outer side (viz., left side in FIG. 2b) and lateral sides (viz., upper and lower sides in FIG. 2b) of the second mounting member 22, and a shaped space (or gap) provided at each of the lateral sides of the member 22 is larger than a shaped space (or gap) at the outer side of the member 22.

Accordingly, upon movement of the second mounting member 22 in an outside direction, the shaped space (or gap) in the hollow part 28 becomes squashed even when the displacement of the of second mounting member 22 is a relatively small, and upon this, the hollow part 28 becomes into contact with the stopper portion 32 causing the elastic force of the rubber-made elastic body 26 to generate a supporting force. While, upon movement of the second mounting member 22 in a lateral direction, a relatively small displacement of the member 22 is absorbed by the shaped space (or gap) in the hollow part 28, which generates a vibration absorbing effect. While, when a relatively large displacement of the second mounting member 22 is made, the shaped space (or gap) in the hollow part 28 is largely squashed and thus the supporting force by the elastic force of the rubber-made elastic body 26 is instantly produced.

The hollow part 29 is arranged at an inside position (viz., right side in FIG. 2b) of the second mounting member 22 and comprises a single portion that extends along an inside surface of the second mounting member 22 and two portions that extend radially outward from both ends of the single portion to the inner cylindrical surface of the second annular part 16.

The hollow part 30 is arranged at a position to contact an inside (viz., right side in FIG. 2b) of the inner cylindrical surface of the second annular part 16 having a part of the rubber-made elastic body 26 disposed between the hollow parts 29 and 30. The hollow part 30 is generally rectangular in a top plan view.

Due to the above-mentioned shape of the hollow parts 29 and 30, upon movement of the second mounting member 22 in the axial direction of the torque rod toward the first annular part 14 (viz., rightward in FIG. 2b) with a certain force (viz., a force that works upon vehicle acceleration), a relatively small displacement is absorbed by the shaped space in the hollow part 29 and thus the vibration absorbing effect is exhibited. While, when a middle-sized displacement of the second mounting member 22 takes place, the shaped space in the hollow part 29 is mediumly squashed and then the supporting force by the elastic force of the rubber-made elastic body 26 (more specifically, the part placed between the hollow parts 29 and 30) is generated. When a relatively large displacement of the second mounting member 22 takes place, the respective shaped spaces in the hollow parts 29 and 30 are largely squashed and then the parts 29 and 30 are brought into contact with the stopper portion 24 thereby causing the elastic force of the rubber-made elastic body 26 to generate the supporting force.

That is, against the force in the axial direction of the torque rod that is applied from the power unit to the vehicle body upon vehicle acceleration, the torque rod 10 exhibits a vibration absorbing effect and generates a supporting force by the work of the hollow parts 29 and 30 and the rubber-made elastic body 26.

For practical use of the torque rod 10, for example, the first mounting member 20 is connected through a bracket (not shown) to a power unit such as an engine or the like on a vehicle, and the second mounting member 22 is connected through a connecting member such as a bolt or the like to a torque rod connecting portion (not shown) provided on a vehicle body. With this arrangement, displacement of the power unit in a roll direction and in a vehicle body longitudinal direction, which would be caused by a torque reaction force of the power unit and an inertial force produced when the vehicle makes a sudden start and a sudden stop, can be damply restricted by the work of the torque rod 10.

The connecting stay portion 18 is formed with a recess 18a in a surface including an outer cylindrical surface of the first annular part 14, the recess 18a being gradually widened as the recess extends from the side of the first annular part 14 to the side of the second annular part 16. Due to provision of the recess 18a, the connecting stay portion 18, which is relatively large in volume because it is made of resin, can be reduced in weight.

From an outer cylindrical portion of the first annular part 14 to a middle part of the recess 18a of the connecting stay portion 18, there is formed a rib structure 100 that extends in the longitudinal direction of the rod body 12. The rib structure 100 is defined by two rib defining grooves that extend around the outer cylindrical surface of the first annular part 14. Accordingly, the outer cylindrical surface of the first annular part 14 having the rib structure 100 has a cross section that includes a crest middle part, two trough parts respectively placed at both sides of the crest middle part and two crest parts respectively placed at outer sides of the two trough parts. All of the crest parts are made flush with one another. An end portion of the rib structure 100 is indicated by reference "S1". As is seen from FIG. 2b, respective ends of the two rib defining grooves that define the rib structure 100 are connected or merged in the recess 18a of the connecting stay portion 18.

Because the middle part of the outer cylindrical surface of the first annular part 14 has a crest portion (or rib structure 100), a load withstanding performance against a force (viz., extension force and compression force) in the axial direction of the rod body 12 that is transmitted from the power unit to the vehicle body can be increased.

From an outer cylindrical surface of the second annular part 16 to a middle part of the connecting stay portion 18, there is formed a rib structure 200 that extends in the longitudinal direction of the rod body 12. The rib structure 200 is defined by one rib defining groove that extends around a vertically middle part of the outer cylindrical surface of the second annular part 16. Accordingly, the outer cylindrical surface of the second annular part 16 having the rib structure 200 has a cross section that includes a trough-like middle part and two crest parts respectively placed at both sides of the trough-like middle part. The two crest parts are made flush with each other. An end portion of the rib structure 200 is indicated by reference "S2".

It is to be noted that the end portion "S1" of the rib structure 100 is positioned closer to the second annular part 16 than the end portion "S2" of the rib structure 200 with respect to the axial direction of the torque rod. That is, the rib structure 100 and the other rib structure 200 are overlapped in the axial direction of the torque rod. With this arrangement, when a twisting force is applied between the first annular part 14 and the is second annular part 16, the load can be dispersed to the rib structures 100 and 200 through the overlapped portion.

(Operation)

In the following, operation will be described.

As is seen from FIGS. 1 to 3, in the torque rod 10 of this embodiment, the rod body 12 is made of resin. By making the rod body 12 thicker than a rod body of metal, the strength is secured.

Thus, weight reduction of the torque rod 10 is achieved.

Furthermore, by forming the rib structures 100 and 200 on the outer peripheral surface of the rod body 12, much increased strength of the torque rod is obtained. Due to provision of the recess 18a by the connecting stay portion 18, further weight reduction of the rod body 12 is obtained.

The end portion "S1" of the rib structure 100 is positioned closer to the second annular part 16 than the end portion "S2" of the other rib structure 200 with respect to the axial direction of the torque rod, and thus, the rib structure 100 and the other rib structure 200 are overlapped with respect to (or in) the axial direction of the torque rod.

Accordingly, when a twisting force is applied between the first annular part 14 and the second annular part 16, the load can be dispersed to the overlapped rib structures 100 and 200 without applying a stress to the connecting stay portion 18.

Furthermore, since the middle portion of the rib structure 100 is shaped like a crest, a load withstanding performance against a force (viz., extension force and compression force) in the axial direction of the rod body 12 that is transmitted from the power unit to the vehicle body can be increased.

Furthermore, due to the shape of the hollow parts 29 and 30 of the rubber-made elastic body 26, a relatively small displacement of the second mounting member 22, which is made by a force (viz., a force operated upon vehicle acceleration) that urges the second mounting member 22 to move toward the first annular part 14 in the axial direction of the torque rod, is absorbed by the shaped space in the hollow part 29, and thus, a vibration absorbing effect is exhibited. While, when the second mounting member 22 is subjected to a middle-sized displacement, the shaped space in the hollow part 29 is mediumly squashed and then the supporting force is generated by the elastic force of the rubber-made elastic body 26 (viz., the part placed between the hollow parts 29 and 30). Furthermore, when the second mounting member 22 is subjected to a relatively large displacement, the respective shaped spaces in the hollow parts 29 and 30 are both largely squashed and then the parts 29 and 30 are brought into contact with the stopper portion 24 thereby causing the elastic force of the rubber-made elastic body 26 to generate the supporting force.

That is, against the force in the axial direction of the torque rod that is applied from the power unit to the vehicle body upon vehicle acceleration, the torque rod 10 exhibits a vibration absorbing effect and generates a supporting force by the work of the hollow parts 29 and 30 and the rubber-made elastic body 26.

The body part 22c of the second mounting member 22, which is sandwiched between the flange parts 22a and 22b, is made smaller in outer size than the flange parts 22a and 22b.

Since the rod body 12 is made of resin, the rod body 12 has to be made thicker than a metal-made rod body. However, fortunately this thicker construction of the rod body 12 allows the rod body 12 to prepare or form a space for receiving therein the rubber-made elastic body 26 and thus the rod body 12 can secure a stroke of the elastic deformation of the rubber-made elastic body 26.

As is described hereinabove, in the torque rod 10 of this embodiment, the rod body 12 is made of resin and the outer peripheral surface of the rod body 12 is formed with the recess 18a and rib structures 100 and 200. These rib structures 100 and 200 are overlapped in the axial direction of the torque rod. The rubber-made elastic body 26 is formed with the hollow parts or bored parts 29 and 30. Furthermore, the body part 22c of the second mounting member 22 is made smaller in outer size than the flange parts 22a and 22b.

With the above-mentioned construction, weight reduction and strength enhancement of the torque rod 10 are both realized. Furthermore, a stroke of the elastic deformation of the rubber-made elastic body 26 is secured, and thus, vibration absorbing effect and increase in supporting force are obtained. Furthermore, a load withstanding performance against a force in the axial direction of the torque rod can be increased due to provision of the rib structure 100.

In this embodiment, the first annular part 14 corresponds to a first annular part and the second annular part 16 corresponds to a second annular part. The connecting stay portion 18 corresponds to a connecting portion, and the recess 18a corresponds to a recess. Furthermore, the rubber bush 24 corresponds to a first elastic member, and the first mounting member 20 corresponds to a first metal collar member. Furthermore, the rubber-made elastic body 26 corresponds to an elastic member, and the second mounting member 22 corresponds to a second metal collar member. Furthermore, the rib structure 100 corresponds to a first rib structure, and the rib structure 200 corresponds to a second rib structure. The flange parts 22a and 22b correspond to flange parts and the body part 22c corresponds to a body part. Furthermore, the hollow part 29 corresponds to a first hollow part and the hollow part 30 corresponds to a second hollow part.

(Effects of the First Embodiment)

(1) There are provided a first annular part of resin and a second annular part of resin which are connected to each other with respective axes mutually twisted. There is provided a first rib structure that is formed on a surface including an outer cylindrical surface of the first annular part and has an end portion in a recess that is formed on a resin-made connecting portion through which the first and second annular parts are connected. Furthermore, there is provided a second rib structure that is formed on a surface including an outer cylindrical surface of the second annular part and has an end portion that is provided between the first and second annular parts at a position nearer to the first annular part than the end portion of the first rib structure.

Since, as is described hereinabove, the connecting portion between the first and second annular parts is made of resin and the connecting portion is provided with the recess, reduction in weight of the torque rod is realized. Furthermore, since the outer cylindrical surfaces of the first and second annular parts are formed with the first and second rib structures and these rib structures are overlapped at the connecting portion, increased strength against extension force, compression force and twisting force is realized.

Accordingly, further weight reduction and strength enhancement of the torque rod can be realized.

(2) The first rib structure is a rib structure that is formed on the outer cylindrical surface of the first annular part and forms a crest part at a middle position of the first annular part in the direction of thickness of the first annular part.

Accordingly, a load withstanding performance against a force (viz., extension force and compression force) in the axial direction of the torque rod that is transmitted from the power unit to the vehicle body can be increased.

(3) The second metal collar member comprises flange parts that constitute end surfaces and a body part that is sandwiched between the flange parts.

Since the first and second annular parts and the connecting portion are made of resin, these parts and portion have to be made thicker than those made of metal. However, fortunately this thicker construction allows them to form a space for receiving therein the second elastic member and thus such thicker construction can secure a stroke of the elastic deformation of the second elastic member.

(4) The second elastic member has a first hollow part that is provided at a side of the second metal collar member that is directed toward the first annular part and a second hollow part that is spaced from the first hollow part and placed nearer to the first annular part than the first hollow part.

With this arrangement, a relatively small displacement of the second metal collar member, which is caused by a force (viz., a force operated upon vehicle acceleration) that urges the second metal collar member to move toward the first annular part in the longitudinal direction (or axial direction) of the torque rod, is absorbed by a shaped space (or gap) in the first hollow part and thus a vibration absorbing effect is exhibited. While, when the second metal collar member is subjected to a middle-sized displacement, the shaped space in the first hollow part is mediumly squashed and then the supporting force by the elastic force of the second elastic member (viz., the part between the first hollow part and the second hollow part) is generated. Furthermore, when the second metal collar member is subjected to a relatively large displacement, the respective shape spaces in the first and second hollow parts are largely squashed and then the parts are brought into contact with the inner cylindrical side of the second annular part thereby causing the elastic force of the second elastic member to generate the supporting force.

Accordingly, against a force in the longitudinal direction (or axial direction) of the torque rod that is applied from the power unit to the vehicle body upon vehicle acceleration, the torque rod exhibits a vibration absorbing effect and generates a supporting force by the work of the first hollow part, the second hollow part and the elastic member.

Second Embodiment

In the following, a second embodiment of the present invention will be described.

(Construction)

In a torque rod 10 of this second embodiment, construction of the rib structure 200 is different from that of the first embodiment.

Thus, in the following, only the rib structure 200 which is different will be described.

Figure 5:
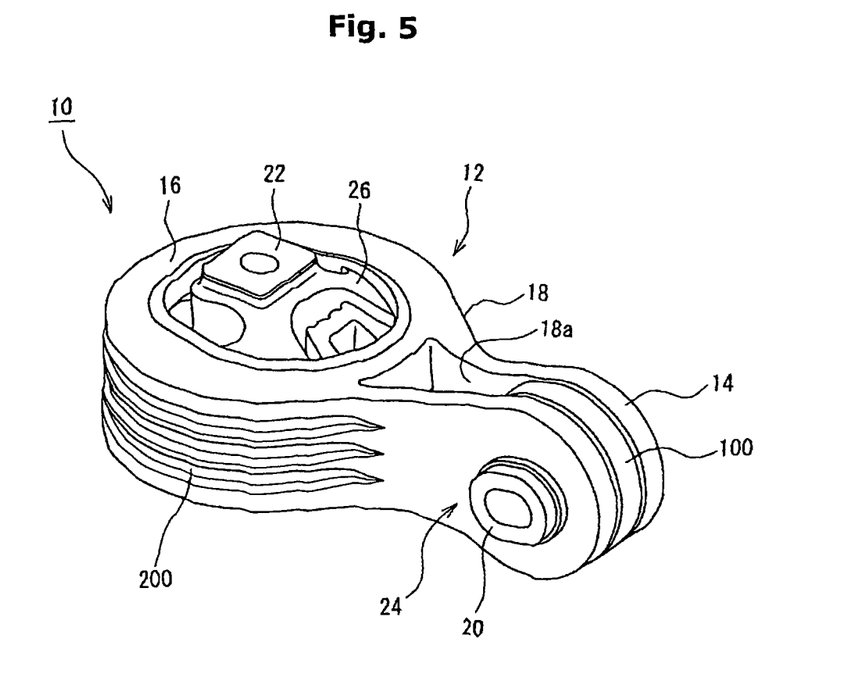
FIG. 5 is a perspective view showing a construction of a torque rod 10 which is a second embodiment of the present invention.
Figure 6A:
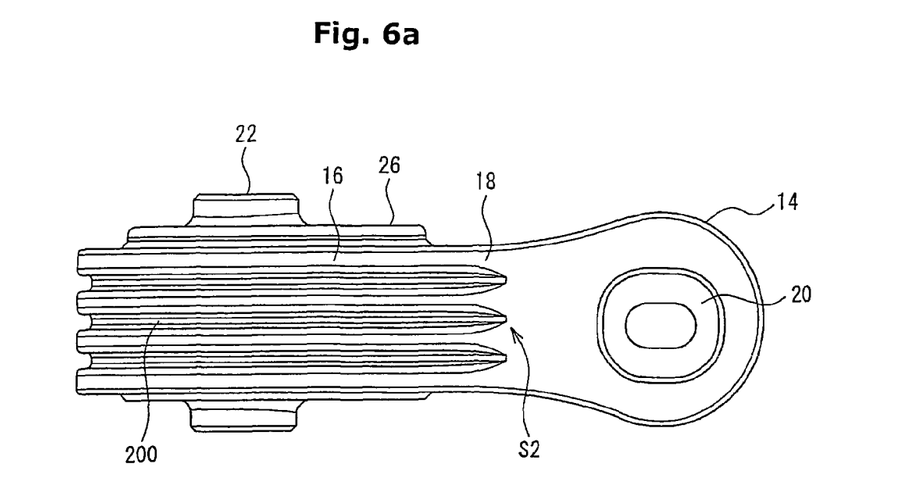
FIG. 6 provides front and top views which respectively show the construction of the torque rod 10 of the second embodiment.
Figure 6B:
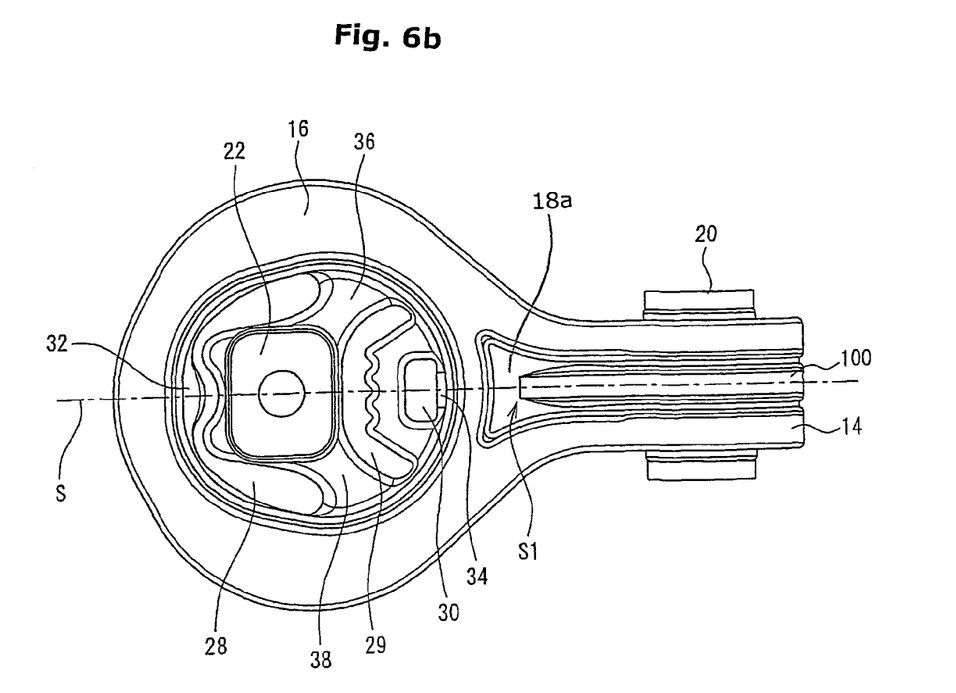
Figure 7:
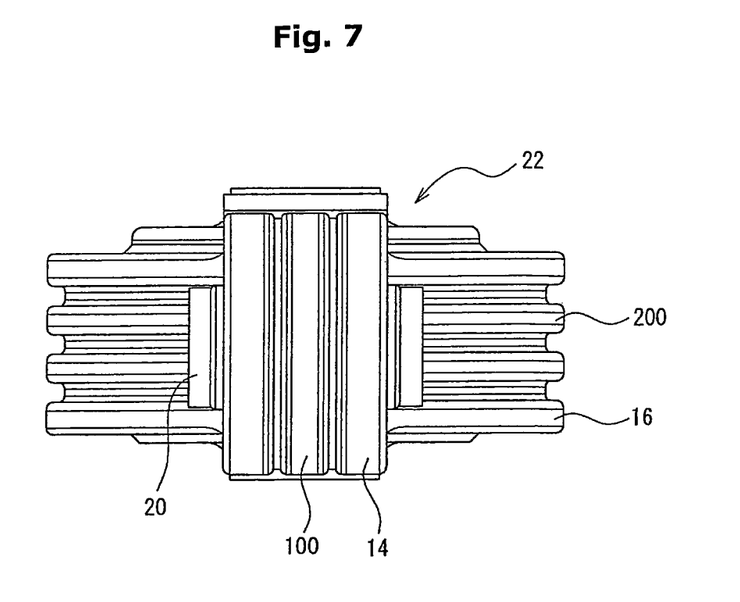
FIG. 7 is a right side view showing the construction of the torque rod 10 of the second embodiment.

Referring to FIGS. 5 to 7, there is shown a construction of a torque rod 10 of the second embodiment, in which FIG. 5 is a perspective view, FIG. 6a is a front view, FIG. 6b is a top view and FIG. 7 is a right side view.

As is seen from FIGS. 5 to 7, from an outer cylindrical surface of the second annular part 16 to a middle part of the connecting stay portion 18, there is formed a rib structure 200 that extends in the longitudinal direction of the rod body 12. The rib structure 200 is defined by three rib defining grooves that are formed on and extend around the outer cylindrical surface of the second annular part 16. Accordingly, the outer cylindrical surface of the second annular part 16 having the rib structure 200 has three trough parts. Crest parts that put therebetween the three trough parts are flush with one another. An end portion of the rib structure 200 is indicated by reference "S2".

Like in the first embodiment, the end portion "S1" of the rib structure 100 is positioned nearer to the second annular part than the end portion "S2" of the rib structure 200 in the axial direction of the torque rod. That is, the rib structure 100 and the other rib structure 200 are overlapped in the axial direction of the torque rod. When, with this arrangement, a twisting force is applied between the first and second annular parts 14 and 16, the load can be dispersed to the rib structures 100 and 200 through the overlapped portion.

(Operation)

In the following, operation will be described.

As is seen from FIGS. 5 to 7, in the torque rod 10 of this embodiment, the rod body 12 is made of resin. By making the rod body 12 thicker than a rod body of metal, the strength is secured.

Thus, weight reduction of the torque rod 10 is achieved.

Furthermore, by forming the rib structures 100 and 200 on the outer peripheral surface of the rod body 12, much increased strength of the torque rod is obtained. Due to provision of the recess 18a by the connecting stay portion 18, further weight reduction of the rod body 12 is obtained.

The end portion "S1" of the rib structure 100 is positioned closer to the second annular part than the end portion "S2" of the other rib structure 200 with respect to the axial direction of the torque rod, and thus, the rib structure 100 and the other rib structure 200 are overlapped in the axial direction of the torque rod.

Accordingly, when a twisting force is applied between the first annular part 14 and the second annular part 16, the load can be dispersed to the overlapped rib structures 100 and 200 without applying a stress to the connecting stay portion 18.

Furthermore, since the middle portion of the rib structure 100 is shaped like a crest, a load withstanding performance against a force (viz., extension force and compression force) in the axial direction of the rod body 12 that is transmitted from the power unit to the vehicle body can be increased. Furthermore, since the rib structure 200 is constructed to have three trough parts, weight reduction of the rod body 12 and increased strength of the same can be realized in a well-balanced manner.

Furthermore, due to the shape of the hollow parts 29 and 30 of the rubber-made elastic body 26, a relatively small displacement of the second mounting member 22, which is caused by a force (viz., a force operated upon acceleration of an associated vehicle) that urges the second mounting member 22 to move toward the first annular part 14 in the axial direction of the torque rod, is absorbed by the shaped space in the hollow part 29 and thus a vibration absorbing effect is exhibited. While, when the second mounting member 22 is subjected to a middle-sized displacement, the shaped space in the hollow part 29 is mediumly squashed and then the supporting force is generated by the elastic force of the rubber-made elastic body 26 (viz., the part placed between the hollow parts 29 and 30). Furthermore, when the second mounting member 22 is subjected to a relatively large displacement, the respective shaped spaces in the hollow parts 29 and 30 are both largely squashed and then parts 20 and 30 are brought into contact with the stopper portion 24 thereby causing the elastic force of the rubber-made elastic body 26 to generate the supporting force.

Against the force in the axial direction of the torque rod which is applied from the power unit to the vehicle body upon vehicle acceleration, the torque rod 10 exhibits a vibration absorbing effect and generates a supporting force by the work of the hollow parts 29 and 30 and the rubber-made elastic body 26.

The body part 22c of the second mounting member 22, which is sandwiched between the flange parts 22a and 22b, is made smaller in outer size than the flange parts 22a and 22b.

Since the rod body 12 is made of resin, the rod body 12 has be made thicker than a metal-made rod body. However, fortunately, this thicker construction of the rod body 12 allows the rod body 12 to prepare or form a space for receiving therein the rubber-made elastic body 26 and thus the rod body 12 can secure a stroke of the elastic deformation of the rubber-made elastic body 26.

As is described hereinabove, in the torque rod 10 of this embodiment, the rod body 12 is made of resin and the outer peripheral surface of the rod body 12 is formed with the recess 18a and the rib structures 100 and 200. These rib structures 100 and 200 are overlapped in the axial direction of the torque rod. Furthermore, the rib structure 200 has a rib arrangement in which three trough parts extend in parallel. The rubber-made elastic body 26 is formed with hollow parts or bored parts 29 and 30. Furthermore, the body part 22c of the second mounting member 22 is made smaller in outer size than the flange parts 22a and 22b.

With the above-mentioned construction, by suitably selecting the number of the ribs 200, weight reduction and strength enhancement of the torque rod 10 can be realized in a well-balanced manner. Furthermore, the torque rod can secure a stoke of the elastic deformation of the rubber-made elastic body 26 and thus, a vibration absorbing effect and an increase in supporting force are both obtained. Furthermore, a load withstanding performance against an input force in the axial direction of the torque rod can be increased.

In this embodiment, the first annular part 14 corresponds to a first annular part and the second annular part 16 corresponds to a second annular part. The connecting stay portion 18 corresponds to a connecting portion, and the recess 18a corresponds to a recess. Furthermore, the rubber bush 24 corresponds to a first elastic member, and the first mounting member 20 corresponds to a first metal collar member. Furthermore, the rubber-made elastic body 26 corresponds to a second elastic member, and the second mounting member 22 corresponds to a second metal collar member. Furthermore, the rib structure 100 corresponds to a first rib structure and the rib structure 200 corresponds to a second rib structure. The flange parts 22a and 22b correspond to flange parts and the body part 22c corresponds to a body part. Furthermore, the hollow part 29 corresponds to a first hollow part and the hollow part 30 corresponds to a second hollow part.

(Effects of the Second Embodiment)

(1) The second rib structure is constructed to have a plurality of ribs that extend parallelly on a surface including the outer cylindrical surface of the second annular part.

Thus, by suitably selecting the number of the ribs, weight reduction of the torque rod and increase in strength of the same can be realized in a well-balanced manner.

(Modification)

In the first and second embodiments, the end portion "S1" of the rib structure 100 is set at a middle position of the recess 18a. However, the end portion "S1" of the rib structure 100 may be set in the recess 18a at a position nearer to the second annular part 16.

Figure 8:
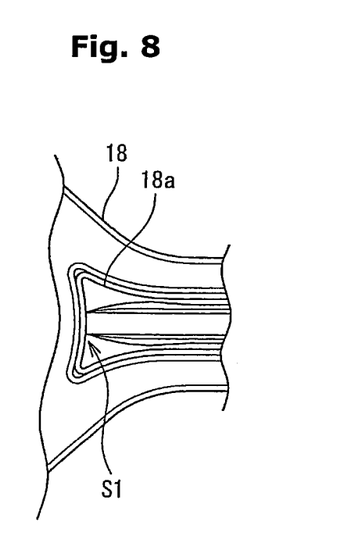
FIG. 8 is a drawing showing an end portion Si of a rib structure 100 employed in an application example of the present invention.

FIG. 8 is a drawing showing the position of the end portion "S1" of the rib structure 100 in case of the modification.

When this modification is adopted, the overlapped portion between the first and second rib structures 100 and 200 in the axial direction of the torque rod is increased, and thus the twisting force applied to the first and second annular portions 14 and 16 is much more effectively dispersed to the torque rod.

(Effect)

Due to the increased overlapped area, the twisting force applied to the first and second annular parts can be much more effectively dispersed to the torque rod.

The invention claimed is:

1. A torque rod comprising:
   a first annular part of resin adapted to connect to a power unit;
   a second annular part of resin adapted to connect to a vehicle body;

a connecting portion of resin that connects the first and second annular parts while arranging these parts at mutually twisted positions, the connecting portion having, at a surface including an outer cylindrical surface of the first annular part, a recess;

a first elastic member provided in an inner cylindrical surface of the first annular part;

a first metal collar member of which an outer peripheral portion is supported by the first elastic member;

a second elastic member provided in an inner cylindrical surface of the second annular part;

a second metal collar member of which an outer peripheral portion is supported by the second elastic member;

a first rib structure formed on the surface including the outer cylindrical surface of the first annular part, the first rib structure extending toward the second annular part so that a distal end of the first rib structure is placed in the recess of the connecting portion; and a second rib structure formed on a surface including an outer cylindrical surface of the second annular part, a distal end of the second rib structure being located between the first and second annular parts at a position nearer to the first annular part than the distal end of the first rib structure.

2. The torque rod as claimed in claim 1, wherein the first rib structure and the second rib structure are overlapped in an axial direction of the torque rod.

3. The torque rod as claimed in claim 1, wherein the second rib structure is constructed to have a plurality of parallel ribs that extend on the surface including the outer cylindrical surface of the second annular part.

4. The torque rod as claimed in claim 1, wherein the first rib structure extends to an end of the recess, the end being placed near the second annular part.

5. The torque rod as claimed in claim 1, wherein the first rib structure is a rib structure that is formed on the outer cylindrical surface of the first annular part and comprises a crest part at a middle position of the first annular part in the direction of thickness.

6. The torque rod as claimed in claim 1, wherein the second metal collar member comprises flange parts that constitute end surfaces and a body part that is sandwiched between the flange parts.

7. The torque rod as claimed in claim 1, wherein the second elastic member comprises a first hollow part that is provided at a side of the second metal collar member that is directed toward the first annular part and a second hollow part that is spaced from the first hollow part and placed nearer to the first annular part than the first hollow part.

8. The torque rod as claimed in claim 1, wherein the recess formed at the surface including the outer cylindrical surface of the first annular part gradually widens as the recess extends from a side closer to the first annular part to a side closer to the second annular part.

9. The torque rod as claimed in claim 1, wherein the first rib structure extends from the outer cylindrical surface of the first annular part to a middle of the recess.

10. The torque rod as claimed in claim 1, wherein the first rib structure comprises two rib defining grooves that extend around the outer cylindrical surface of the first annular part.

11. The torque rod as claimed in claim 1, wherein the second rib structure comprises one and only one rib defining groove that extends around the outer cylindrical surface of the second annular part.

* * * * *